United States Patent [19]

Romeas

[11] Patent Number: 4,685,096
[45] Date of Patent: Aug. 4, 1987

[54] OPTICAL DISK WITH PRE-RECORDED MARKER PATTERN

[75] Inventor: Rene Romeas, Palaiseau, France

[73] Assignee: Alcatel Thomson Gigadisc, SA, Paris, France

[21] Appl. No.: 753,538

[22] Filed: Jul. 10, 1985

[30] Foreign Application Priority Data

Jul. 10, 1984 [FR] France ................................ 84 10940

[51] Int. Cl.⁴ .............................................. G11B 7/00
[52] U.S. Cl. ........................................ 369/44; 369/47; 369/59
[58] Field of Search .................... 369/32, 59, 44–46, 369/47; 358/342; 250/201–204

[56] References Cited

U.S. PATENT DOCUMENTS 4,566,091  1/1986  Gerard et al. ...................... 369/47

Primary Examiner—Robert L. Richardson
Attorney, Agent, or Firm—Cushman, Darby & Cushman

[57] ABSTRACT

An optical recording disk comprises a track divided into sectors and having a longitudinal axis. Areas on this track for writing data using a predetermined increment alternate with prewritten marker areas. Each of these comprises at least two patterns having leading and trailing edges. Part of at least one of these patterns is offcenter relative to the track axis and associated with at least one edge of a pair of leading and trailing edges combined with another pair of leading and trailing edges to define along the axis two predetermined distances. Each of these distances is between two consecutive multiples of the data writing increment. The patterns are adapted to be scanned optically in succession by a read spot to detect any track following error, by virtue of interaction of the read spot with at least the offcenter pattern part, and with reference to a timebase synchronization signal resulting from interaction of the read spot with at least two leading edges and at least two trailing edges.

15 Claims, 11 Drawing Figures

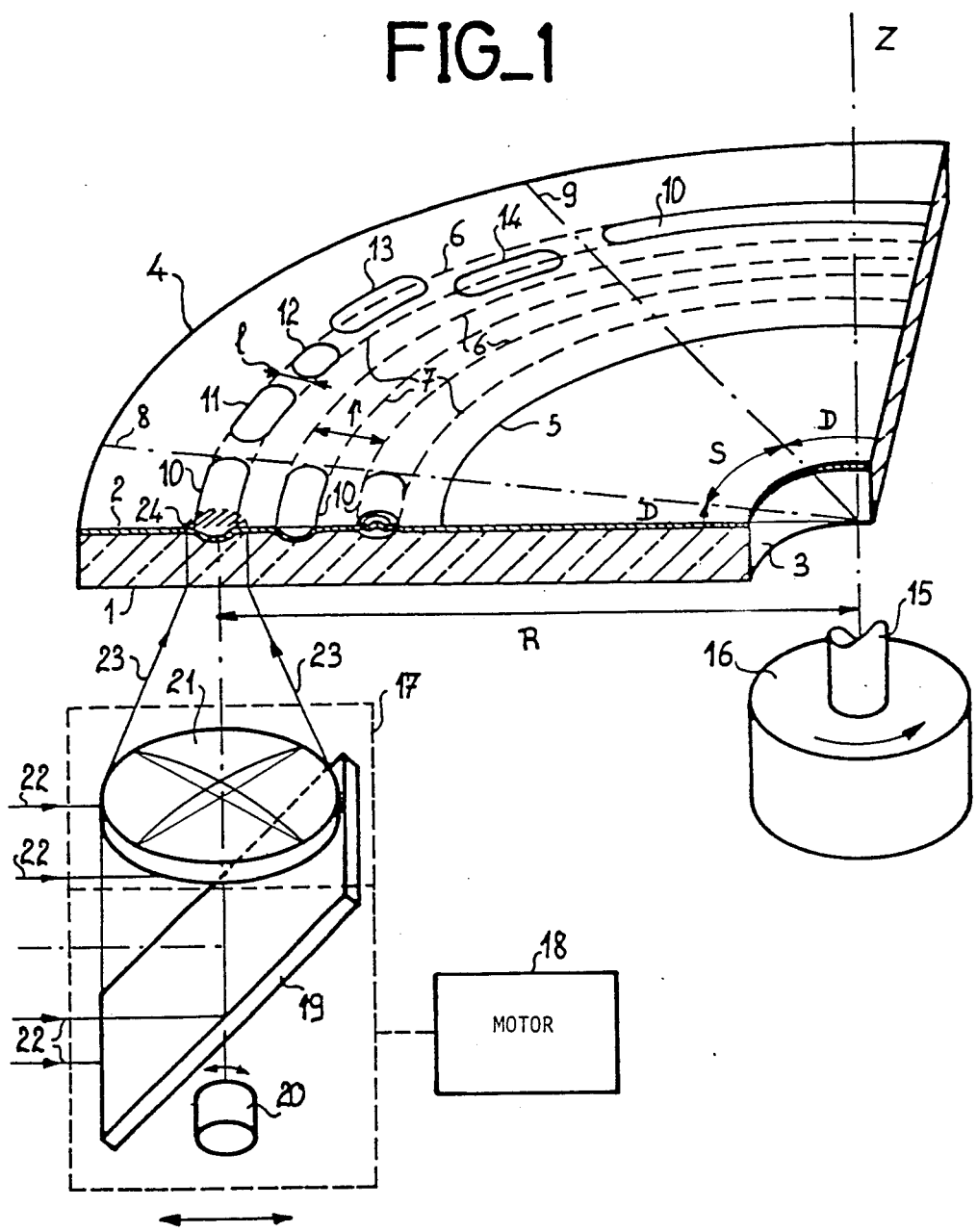

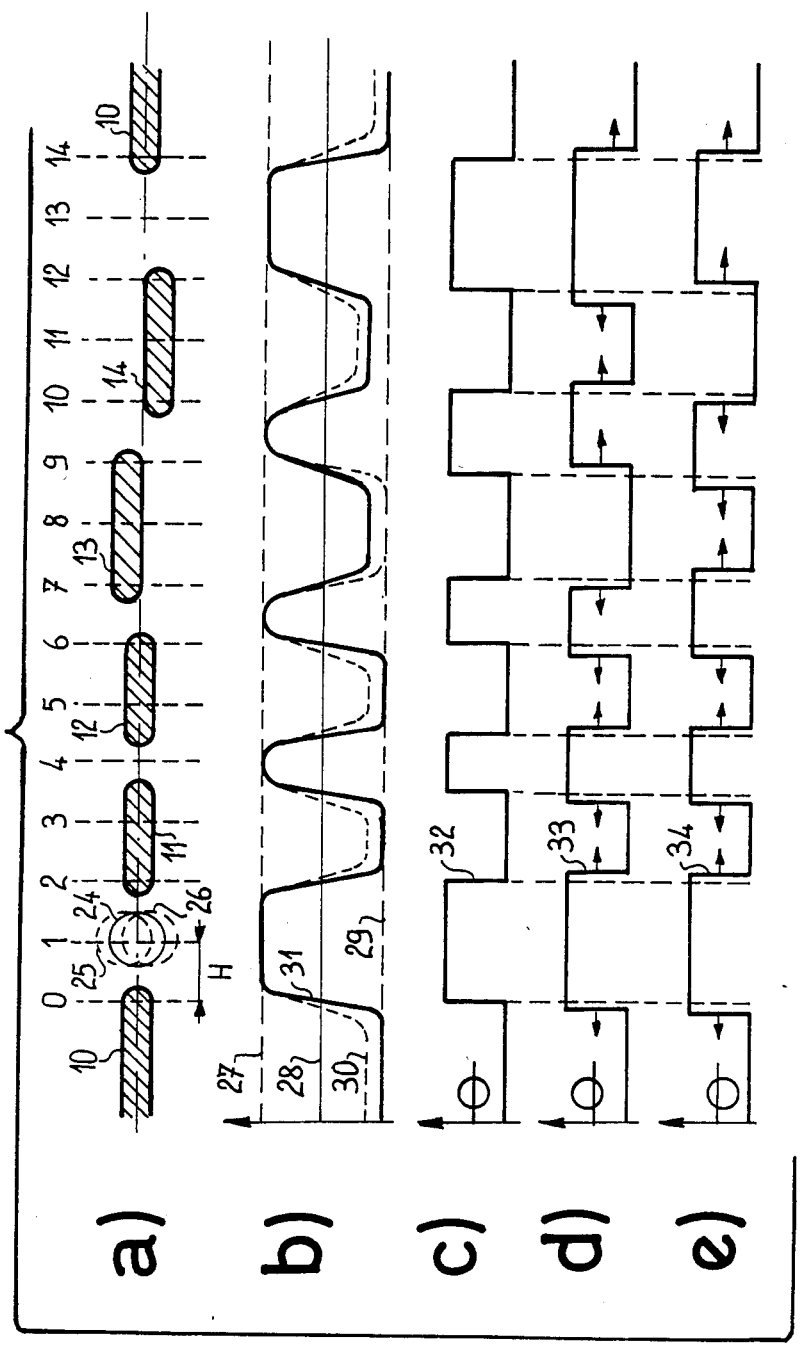

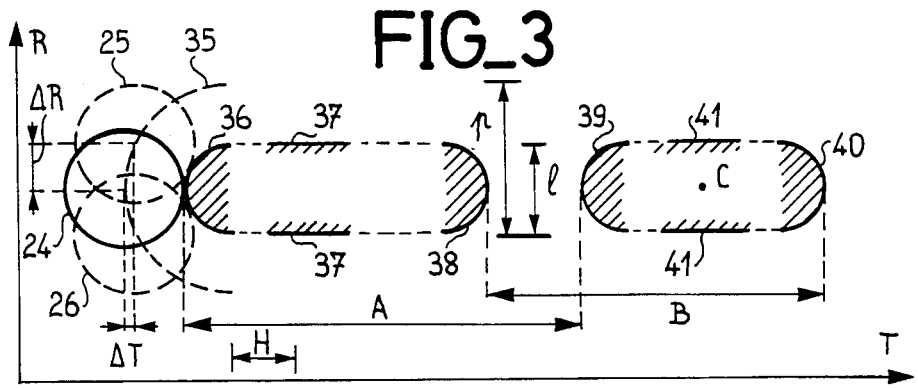
FIG_3
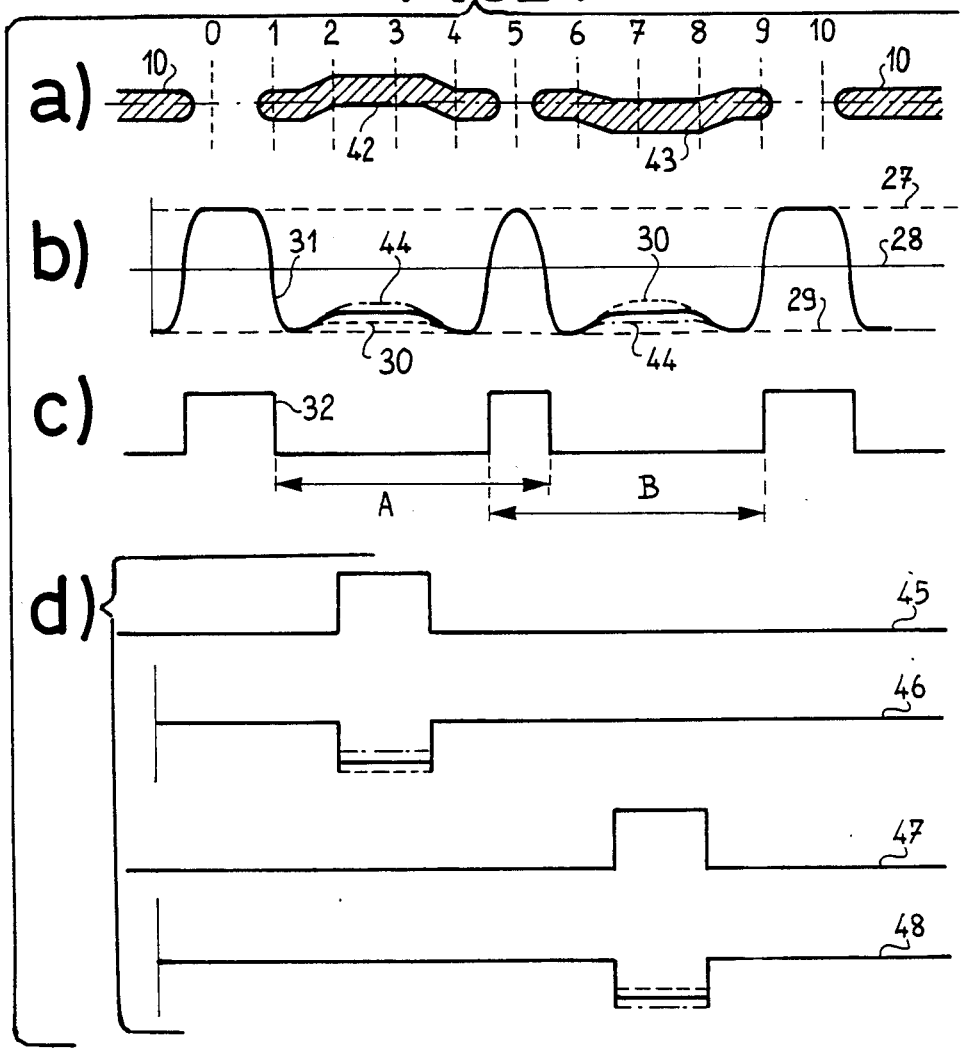
FIG_4

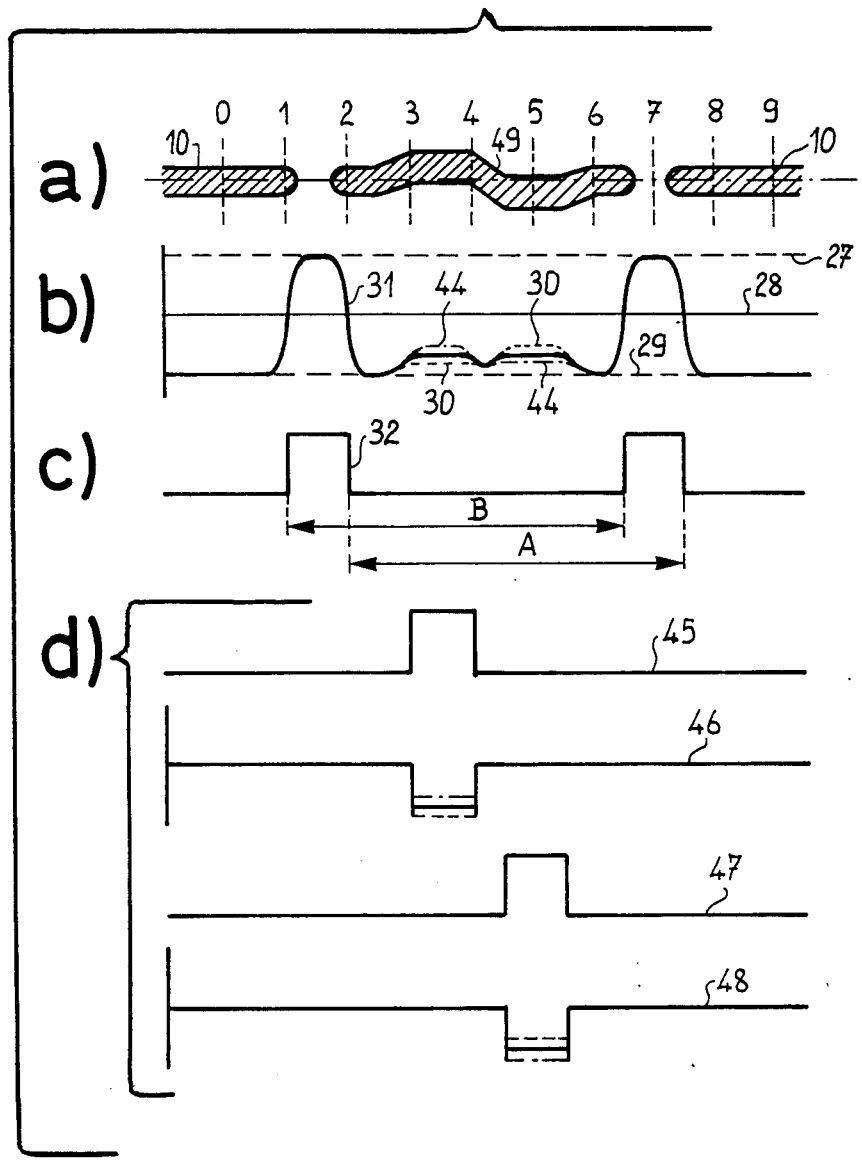
FIG_5

FIG_6
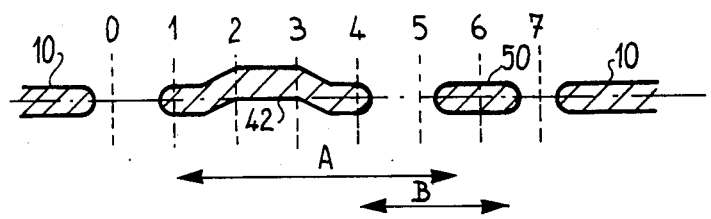
FIG_7
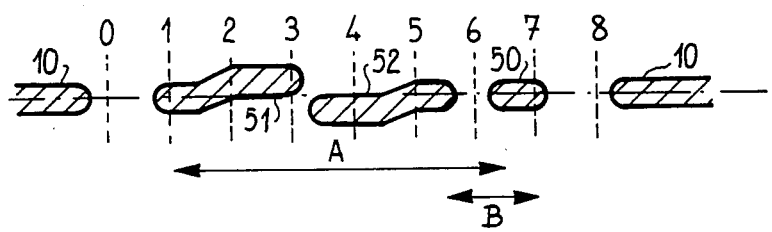
FIG_8
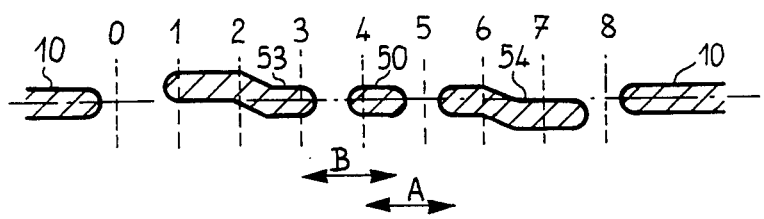
FIG_9
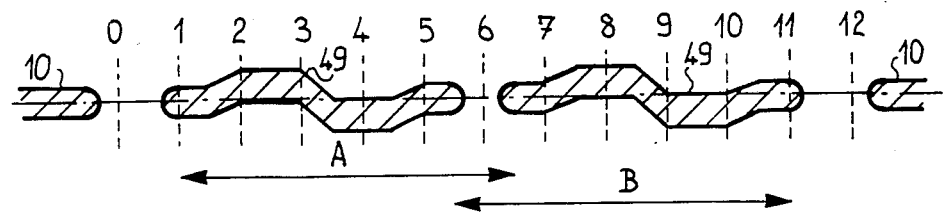

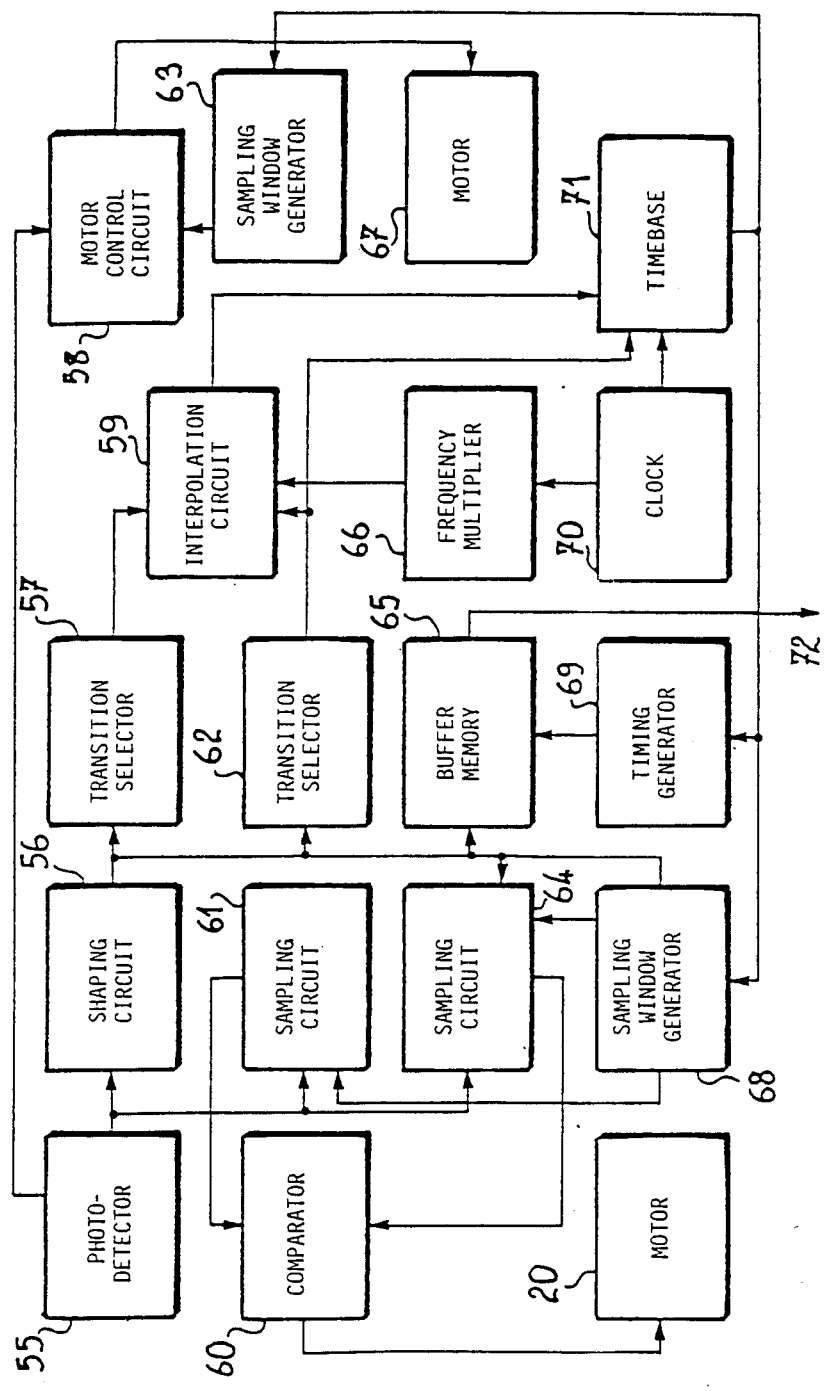
FIG_10

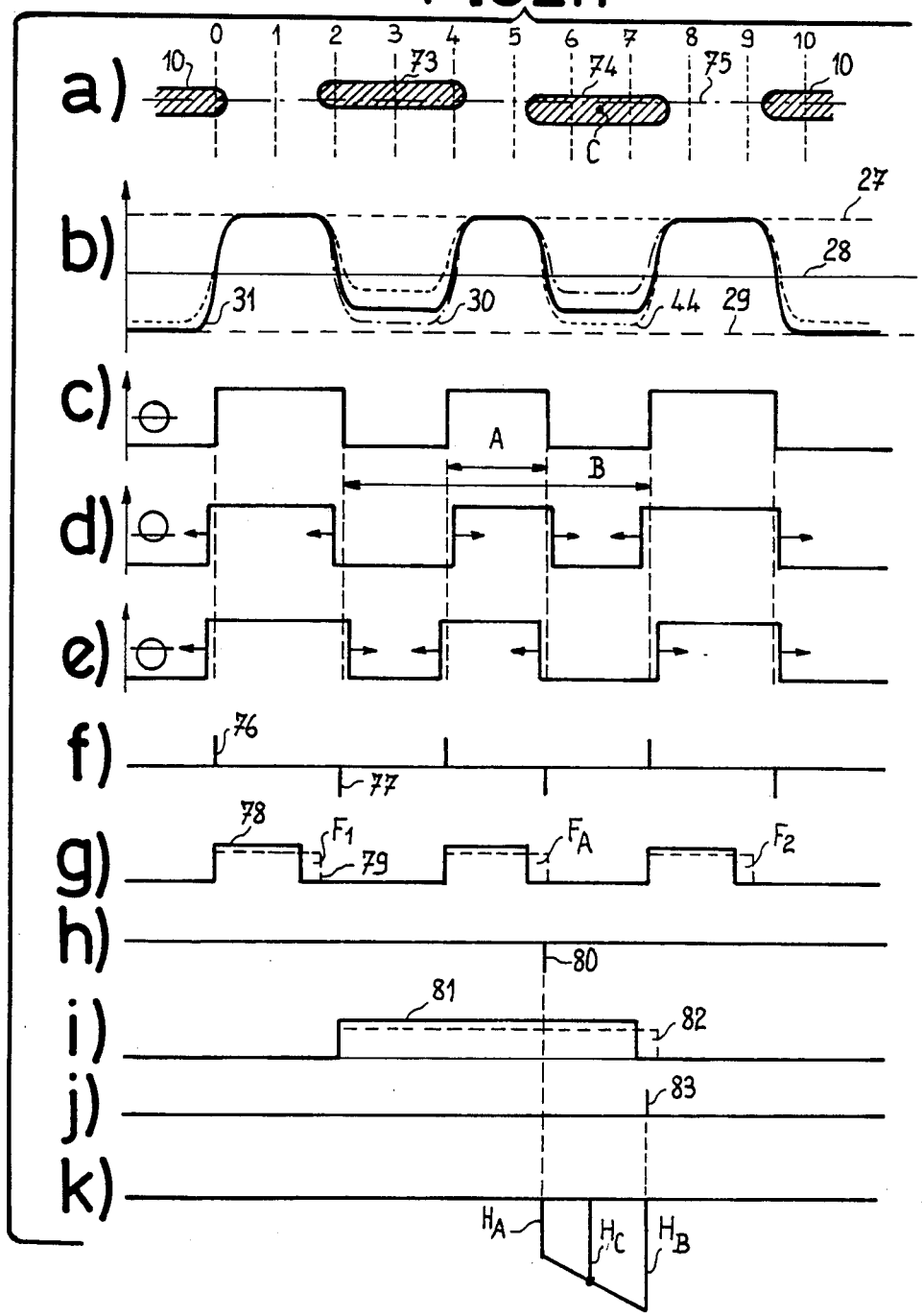
FIG_11

OPTICAL DISK WITH PRE-RECORDED MARKER PATTERN

BACKGROUND OF THE INVENTION

1. Field of the Invention

The present invention concerns an information medium which can be written optically along a track the elements of which are shown by prewritten patterns in a surface.

2. Description of the Prior Art

An information medium of this kind typically consists of a disk a light-sensitive surface of which is scanned by an optical beam along a spiral path with a pitch of the order of one micron. It is to be understood that the invention also covers the case of a track the elements of which consist of concentric circles. The light-sensitive surface is scanned by a very small light spot which is used to write data along a turn, in the form of surface irregularities, for example. To assign the writing spot a precise position on the light-sensitive surface, each turn is marked by prewritten patterns which may also consist of surface irregularities. The prewritten patterns generally result from the information medium manufacturing process and because of this their location corresponds to a specific format which defines areas reserved for writing data alternating with prewritten areas which divide up the available space. This particular arrangement is advantageous since the subsequent writing of an information medium in order to store useful information on it has no effect on the service information contained in the prewritten areas.

Service information is that which enables the data along the track to be located and which enables the memory plane to be compartmented using appropriate addresses.

The present invention is more particularly concerned with the prewritten structure which enables the read or write spot to be maintained centered on the axis of the track and which provides the reference timing marks enabling the signals to be sampled with their position along the track taken into account.

In the case of single-spot scanning, it is convenient to provide a prewritten structure comprising offcenter patterns so that a track following error signal may be obtained by comparing samples. A structure of this kind further comprises patterns making it possible to set sampling timing marks in order that the track following error signal has the appropriate sign to maintain the spot correctly centered relative to the track. These auxiliary patterns may be made larger than the read spot so as to be readily distinguished from the other patterns on the information medium, although this solution complicates the provision of the prewritten areas. It is therefore better to distinguish the auxiliary patterns by dividing them according to an exclusive code, rather than by making them larger.

A prewritten structure comprising an arrangment of patterns organised as indicated above is described in patent application Nos. 82 048218, 82 04219, 82 04220 and 82 04221 filed in France on Mar. 12, 1982 in the name THOMSON-CSF. Prewritten structures featuring offcenter patterns are also described in document Nos. EP-A-0 077 641, EP-A-0 077 642, EP-A-0 077 643 and EP-A-0 077 644 published Apr. 27, 1983.

The prewritten structures referred to hereinabove occupy a certain area on the information medium, commensurately reducing the space available for storing usable data. In these known structures the patterns provided for synchronization purposes are situated, ahead of those which are used for track following, which unnecessarily increases the length of the prewritten area.

In order to alleviate this disadvantage, the invention proposes a compact prewritten structure using patterns combining the track following and synchronization functions.

SUMMARY OF THE INVENTION

In one aspect, the invention consists in an optical recording medium comprising a track divided into sectors and having longitudinal axis, areas on said track for writing data using a predetermined increment, prewritten marker areas on said track alternating with said data writing areas and each comprising at least two patterns having leading and trailing edges, and a part of at least one of said patterns which is offcenter relative to said axis and associated with at least one edge of a pair of leading and trailing edges combined with another pair of leading and trailing edges to define along said axis two predetermined distances each of which is between two consecutive multiples of said data writing increment, whereby said patterns are adapted to be scanned optically in succession by a read spot to sense any track following error by virtue of interaction of said read spot with at least said offcenter pattern part and with reference to a timebase synchronization signal resulting from interaction of said read spot with at least two leading edges and at least two trailing edges.

In another aspect, the invention conists in an optical track following device for use with a medium of the above kind.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 1 is an isometric view of an information medium comprising a prewritten area and the essential components of a single-spot device for optically writing and reading usable data in reserved areas of a track to be followed.

FIGS. 2(a) thru 2(e) show a known type of prewritten structure and the associated read signals.

FIG. 3 is an explanatory diagram.

FIGS. 4(a) thru 4(d) show a first example of prewritten structure in accordance with the invention.

FIGS. 5(a) thru 5(d) show a second example of prewritten structure in accordance with the invention.

FIGS. 6 through 9 show further examples of prewritten structures in accordance with the invention.

FIG. 10 is a block diagram of a device for reading information media in accordance with the invention.

FIGS. 11(a) thru 11(k) show a further example of prewritten structure in accordance with the invention.

DESCRIPTION OF THE PREFERRED EMBODIMENTS

FIG. 1 shows an information medium represented by way of example as a disk, comprising support layer 1 through which light can pass and a light-sensitive structure 2 interaction of which with a writing light beam provides for transcribing incident data. By way of non-limiting example, the top surface of the support layer 1 comprises pits 10, 11, 12, 13 and 14 forming a prewritten relief pattern. This relief pattern is covered by a light-sensitive structure 2 which mates with its surface and which comprises an underlay of thermodegradable organic material and a thin metal coating. This coating is able to withstand the temperature increase produced by the impact of a writing light beam, but it deforms locally above a particular optical power threshold to form a bubble representing the information used to modulate the writing optical beam. The invention is not limited to light-sensitive structures using bubbles, but also encompasses other known light-sensitive structures in particular those in which the impact of a light beam produces ablation, breakdown of a diazotype compound, a change of physical state or the creation of a latent image. Each pit and each bubble constitutes a prewritten or postwritten pattern. This pattern is delimited on the sensitive surface of the information support by a closed contour and the combination of the patterns effects two-dimensional compartmenting of this surface. The annular area reserved for storing data is generally comprised between the periphery 4 of the information medium and an inside circumference 5. It is subdivided into track sections having a radial width 1 and a pitch p. In FIG. 1 each track section is comprised between two dashed lines 6 and 7 which represents turns of two interleaved spirals the center of which is in principle situated on the rotation axis Z. The information medium is centered by means of a centering hole 3 which is in principle centered relative to the sprials and which corresponds to a bearing surface formed on the rotating shaft 15 of the drive motor 16. The annular area 4, 5 is further subdivided by a set of radii 8 and 9 which define alternating angular sectors D and S. The angular sectors D are assigned to the storage of usable data, whereas the angular sectors S are reserved for prewritten patterns which provide inter alia for showing up any optical track following error. It is to be understood that the information medium structure illustrated in FIG. 1 in reality comprises a very large number of track elements and a very large number of sectors. The size of the sectors S has been exaggerated in FIG. 1, since it is with details of their arrangement that the invention is concerned. It should also be emphasized that the pit shape of the patterns 10 through 14 and the use of the term "prewritten" are in no way limiting to the scope of the invention.

Consideration could be given to patterns having no relief, but distinguished from their surroundings by a difference in optical density or by a change in optical reflecting power. The advantage of prewritten pits or projections is connected with the manufacture of the information medium. The support layer 1 is in fact a copy in relief of a matrix produced by exposing a photoresist. A glass blank covered with a layer of light-sensitive resin is placed in the recording machine which uses a modulated laser beam appropriately focused for the exposure. The laser beam produces a light spot which is generally circular and which is caused to form a particular, for example, spiral, path. By modulating the intensity of the laser beam, the future centered patterns, such as 10, 11, 12 are produced. To define the future offcenter patterns 13, 14, the point of impact of the laser beam is moved, by means of an acoustic-optical deflector, for example, in order to create in the spiral path a transient radial offset of predetermined extent. Given the pulsed exposure mode employed, each prewritten pattern is in the form of a shorter or longer line having a leading edge and a trailing edge the shapes of which recall that of the spot used to obtain them.

FIG. 1 also shows other essential units of an optical recording and reading device which uses the prewritten information medium. In addition to the drive motor 16, it is seen that in order to write usable data it is necessary to provide an optical head 17 capable of projecting a light spot 24 which can illuminate a track element situated at a variable distance R from the rotation axis Z. To this end, the optical head 17 may receive collimated light 22 from a fixed laser which is reflected by a pivoting mirror 19 towards an objective lens 21. The beam 23 focused by the objective lens 21 illuminates the light-sensitive structure 22 through the support layer 1 and gives rise to the spot 24 which may be moved from one track element to the next by means of the motor 20. A larger displacement of the spot 24 may be obtained by moving the optical head 17 using the motor 18.

Optical interaction of the beam 23 with the patterns carried by the information medium means that the light which emerges from the portion of the structure 2 illuminated by the spot 23 has specific characteristics which indicate the presence of the pattern, its location relative to the spot and, where applicable, that it has been postwritten to store usable data. The cross-section at the front of the information medium shows the relief of the pattern 10 situated on three consecutive track elements. The two patterns on the left show only the prewriting and it is seen that the light-sensitive structure 22 remains in intimate contact with the pits in the support layer 1. The pattern on the right has been postwritten, resulting for example in the unsticking of the light-sensitive structure 2 and the formation of a bubble. As a general rule, there is no provision for postwriting the sectors S. Where appropriate, the sectors D may not comprise any prewriting.

The prewritten patterns 11, 12, 13 and 14 situated in the sectors S play an important role in the spatial marking of the track elements and the intertrack spaces which separate them, and also in marking in terms of time the different stages of scanning of the information medium by the spot 24. The patterns 13 and 14 shown in FIG. 1 are more particularly intended to show any tracking errors, while the patterns 11 and 12 are used to synchronize the timebase.

The light detecting means which sense the light which has interacted with the information medium are not shown in FIG. 1, but they are generally disposed in order to collect the light returned through the objective lens 21 from the information medium. In the block diagram of FIG. 10 these means are assigned the reference number 55.

FIG. 2 shows a known type of prewritten structure and the various electrical signals which are obtained by optical interaction of this structure and a spot 24 assumed centered on the longitudinal axis of the track and then moved offcenter upwards or downwards (contours 25 and 26).

In line (a) in FIG. 2 the axis of the track is graduated with an increment H by means of dashed vertical lines numbered 0 through 14. This graduated area represents the extent of a sector S bracketed by two sectors D each of which contains a continuous prewritten pattern 10. In the graduated area there is provided a guard space followed by a first centered pattern 11 which occupies one and a half graduations and an identical second centered pattern 12 shifted towards the right by two and a half graduations. These two patterns 11 and 12 constitute a coded phase mark which an appropriate filter can recognize without reacting to digital data present on the information medium with the writing increment H. In the graduated area there are then provided two further patterns 13 and 14 which are offcenter on opposite sides of the axis of the track. The pattern 13 offcenter upwards extends between graduations 7 and 9 whereas the pattern 14 offcenter downwards extends between graduations 10 and 12. The patterns shown in line (a) in FIG. 2 are shaded to indicate the fact that they are scanned by light-detecting means, appearing less reflective than their smooth surroundings.

The diagram in line (b) in FIG. 2 indicates the read signal provided by the light-detecting means. The signal amplitude is plotted on the vertical axis with a low level 29 and a high level 27. The full-line curve (31) represents the reading of the prewritten structure by a centered spot 24. Note that in the area where the spot interacts with the patterns 13 and 14, the trough in the read signal is less deep, although the depth is the same for the two offcenter patterns. The dashed-line curve 30 represents the read signal with an offcenter spot as shown in line (a) with the contour 25. It is seen that interaction with the patterns 10, 11 and 12 produces less deep troughs and that the troughs corresponding to interaction with patterns 13 and 14 are displaced in opposite directions. This indicates that by sampling the read signal at graduations 8 and 11 and subtracting from it the samples themselves there is obtained an indication of the eccentricity of the spot relative to the axis of the track with the sign of this eccentricity also indicated.

The read signal shown in line (b) in FIG. 2 does not feature sudden transitions. It is therefore reshaped before it is processed in order to extract from it the usable information. This reshaping consists in creating a rectangular signal in which the transitions corresponds to the intersections of the read signal with a decision threshold represented by the line 28.

Line (c) in FIG. 2 shows the signal 32 after reshaping when scanning with a centered spot. Line (d) shows the signal 33 after reshaping corresponding to scanning with a spot offcenter upwards, conforming to the contour 25, and line (e) shows the signal 34 after reshaping corresponding to scanning with a spot offcenter downwards, conforming to the contour 26.

Since the shaped signal is used to synchronize the timebase of the recording-playback device, it is essential that the track following error relative to the position of the transitions has the same effect whatever the sign of the error.

In FIG. 2, lines (d) and (e) show the shifts resulting from track following errors. Horizontal arrows show the tendency of the read system to detect the leading and trailing edges of patterns 11 through 14 earlier or later. Considering the shifts of transitions in the same sense, it is seen that the phase marks 11 and 12 are detected with a shift between these transitions substantially invarient relative to the spot following error. The same does not apply in regard to the tracking marks 13 and 14.

It is thus seen that the prewritten structure of FIG. 2 is satisfactory because only the leading and trailing edges of the two phase marks 11 and 12 are used to synchronize the timebase whereas the only usable part of the tracking marks 13 and 14 consists of the eccentric disposition of their flanks. However, this solution is extremely expensive in terms of space since it employs four spaced marks and guard spaces for the adjacent data sectors.

In the light of the foregoing, the invention proposes a more compact prewritten structure which consists in employing at least two patterns of which one at least features an offcenter portion associated with at least one edge of a pair of leading and trailing edges combined with another pair of leading and trailing edges to define along the axis of the track two predetermined distances, each comprised between two consecutive multiples of the data writing increment.

FIG. 3 is a sketch clearly demonstrating the inventive concept. In a system of coordinates T, R which defines the plane of the information medium surface with the axis of the track along the T axis, there are represented the essential components of two prewritten patterns, without specific regard to their actual contours. For the purposes of showing a tracking error $\Delta R$ of the spot 24, it is the positioning of the flanks 37 and 41 along the R axis which is of importance. On the other hand, to define good synchronization of the timebase it is the leading edges 36 and 39 and the trailing edges 38 and 40 which must be judiciously positioned.

The interaction of the spot with the leading edge 36 is shown in FIG. 3 in which this edge is tangential to the contour 24, 25 or 26 of the read spot when it reaches the lefthand pattern. The curve 35 is the geometrical locus of the center of the spot at the time the interaction begins and makes it possible to indicate the synchronization error $\Delta T$ which results from the eccentricity of the spot $\Delta R$. For the prewritten structure shown in FIG. 3 to be recognizable and separable from the usable data written with the predetermined increment H, two distances A and B are defined by means of two leading edges and two trailing edges which meet the condition that each of them is comprised between two contiguous multiples of the increment H, so that:

$$kH < A < (k+1)H$$

$$mH < B < (m+1)H$$

where k and m are any integers.

A half-integer distance is typically chosen to express the distances A and B as a function of H.

In FIG. 3, the center C of the pattern is shown between the edges 39 and 40 since, because of symmetry, it is the instant that the center of the spot and the center C have the same abscissa which gives the surest indication for synchronizing the timebase. This instant is deduced by linear interpolation between the instants which correspond to the spot crossing the edges 39 and 40 delimiting the pattern with its center at C. In this way errors relating to defocusing of the spot and the prewriting may be eliminated, and the synchronization error $\Delta T$ is compensated for.

Without departing from the scope of the invention, it is also possible to define the distances A and B not between edges of the same kind as shown in FIG. 3, but, for example, between the edges 36 and 40 on the one hand and between the edges 38 and 39 on the other hand. This latter method of pairing the edges is more sensitive to prewriting and focusing errors, but it lends itself to a particularly compact implementation of the prewriting, as will be seen hereinafter.

Having outlined the general characteristics of the prewritten structure in accordance with the invention, the description will now cover the various embodiments which fall within the scope of the present invention.

In line (a) in FIG. 4 there is seen a first example of prewritten structure in accordance with the invention. It is situated between graduations 0 and 10 and comprises two patterns 42 and 43 each of which comprises an offcenter middle part and two centered end parts. The line (b) in FIG. 4 shows the read signal, the same reference numbers being used as in FIG. 2. The curve 44 in chain-dotted line has been added to show the read signal corresponding to an eccentric spot with the contour 26 in FIG. 2. The curve 32 in line (c) in FIG. 4 represents the reshaped signal and indicates the half-integer distances A and B relative to the graduation visible in line (a). The distance A is the distance between the two leading edges of the patterns 42 and 43 whereas the distance B is the distance between the trailing edges. The difference between the patterns 42 and 43 lies in the sense in which the middle part is offcenter. In line (d) in FIG. 4, there is shown the signal 45 defining the read signal sampling window for the first pattern 42 and the signal 47 defining the sampling window for the second pattern 43.

The signals 46 and 48 represent the samples obtained with three heights corresponding to the three cases envisaged in line (b) of FIG. 4. The signals 45 and 47 are delivered by circuits synchronized to the timebase of the recording-playback device, which is synchronized by means of the transitions of signal 32.

The prewritten structure may be made even more compact by adopting the configuration shown in line (a) in FIG. 5. It is seen that this structure associates with a central pattern 49 two bracketing patterns which may consist in extensions of the prewritten groove 10 where the usable data is postwritten. The central pattern 49 comprises two parts offcenter in opposite senses and two centered end parts. The bracketing patterns which extend on the upstream side of graduation 1 and the downstream side of graduation 7 are necessary to define a trailing edge at the extreme left and a leading edge at the extreme right. These two edges are paired with the like edges of the central pattern 49. The distances A and B are indicated in line (c) in FIG. 5. Line (b) through (d) of FIG. 5 are interpreted in the same way as the like lines in FIG. 4. The oblique central part of pattern 49 is optional, but may remain without disadvantage.

By way of numerical example, a prewritten configuration structured as shown in FIG. 5 may be based on a clock period of 200 nanoseconds. Like the other figures, FIG. 5 is subject to two interpretations since it represents a relationship between a geometrical disposition and the electrical signals resulting from this disposition. This relationship naturally depends on the track scanning speed b. A length such as the increment H of the graduations shown in line (a) is related to a time interval the duration of which is the clock period. In the present case, with a scanning speed of 8.25 m/s obtained with a reading radius of 0.0705 m and a rotation speed of approximately 1 120 rpm, it is seen that a clock period of 200 nanoseconds corresponds to a length per bit of 1.65 microns, which makes the overall length of the sector S of FIG. 5 equal to 1.65×9 microns, that is 14.85 microns. This sector S may be adjacent blocks D each comprising 91 clock periods, that is a length per block of 150.15 microns.

The pitch p of the track is typically 1.7 microns, with a track width l equal to 0.6 micron. These dimensions for the track are suitable when the diameter of the scanning spot at mid-height is taken as one micron. The eccentricity of the parts of the pattern 49 comprised between the graduations 3 and 4 in FIG. 5 and straddling the graduation 5 is ±0.3 microns. This eccentricity represents the distance between the offset axis passing through the middle of the width of an offcenter part and the longitudinal axis of the track. The width of the pattern 49 is typically constant and equal to the track width l.

Of the other configurations possible, FIG. 6 shows a prewritten structure which is derived from the configuration of FIG. 4 by substituting for the pattern 43 a pattern 50 which does not have any offcenter part. Because of this, steps must be taken so that on the information medium a sector D for data is bracketed by two sectors S of the type shown in FIG. 6, the sense of the eccentricity of the offcenter part of the pattern 42 alternating. Evaluating a spot following error requires that two samples be taken into account, taken in turn from two consecutive prewritten structures. In the case of FIG. 6, it is not necessary for the prewritten groove 10 to contribute through its extensions to the definition of the phase marks, but it will be understood that the mark 50 may be omitted and that the extensions of the groove 10 towards the mark 42 may fulfill this marker role.

It is also possible, as shown in FIG. 7, to select a prewritten structure configuration with three patterns. This is derived from the configuration of FIG. 6 with the pattern 42 replaced by two patterns 51 and 52 each of which has an offcenter part and a centered part.

The system of FIG. 7 provides two tracking mark samples like the configurations of FIGS. 4 and 5 and is covered by the remark made in relation to FIG. 6 regarding the possibility of substituting the extensions of a prewritten groove for the pattern 50.

The configuration with three patterns is a variation on the FIG. 7 configuration, in which the center pattern 50 is bracketed by patterns 53 and 54 which resemble the patterns 51 and 52 but which are disposed differently in order to obtain distances A and B which are the same and relatively small. Again, the pattern 50 may be replaced by extensions of the grooves 10.

The configuration of FIG. 9 provides four track following samples by repeating the pattern 49 shown in FIG. 5. By virtue of the doubling of the pattern 49, it is no longer necessary to depend on the extensions of the groove 10 to define the distances A and B.

FIG. 10 shows by way of non-limiting example the electrical circuit of an information transcription device adapted to use the prewritten structure in accordance with the invention.

This circuit comprises photodetector means 55 which deliver the read signal shown in line (b) in FIGS. 4 and 5. This read signal is applied to the input of a shaping circuit 56 and to the inputs of two sample and hold circuits 61 and 64 which hold the sampled value until the next sampling command. The outputs of the circuits 61 and 64 are connected to the inputs of a comparator circuit 60 which delivers a track following error signal controlling the motor 20 which orients the mirror 14. The sample and hold circuits 61 and 64 are controlled by a sampling window generator circuit 68 which produces the signals shown in line (d) in FIGS. 4 and 5 with the references 45 and 47. The time reference needed for marking the sampling windows is supplied to the generator 68 by a timebase circuit 71.

The circuit 71 is driven by a clock 70 which provides the timing H for scanning the usable data which, neglecting the effects of synchronization, corresponds to the graduations shown in line (a) in FIGS. 4 and 5.

The circuit 71 also receives a synchronization signal from an interpolator circuit 59. It is the detection of the phase marks which determines the functioning of the interpolator circuit 59. To this end the reshaped signal supplied by the circuit 56 is applied to the two transition selector circuits 57 and 62.

The function of the selector circuit 57 is to isolate the transition which, in FIGS. 3 through 9, marks the beginning of the second phase mark; the selector circuit 56 is responsible for isolating the transition which marks the end of this mark.

To achieve this selection, each selector circuit 57 or 62 comprises a sampling window generator which takes as the time reference any transition in the shaped signal having the appropriate sign. The sampling window is produced in such a way as to take the transition at a distance A or B from the initiating transition. As the transition selected must actually be one of those which delimit the second phase mark, it is necessary to provide sufficient dead space on the upstream side of the phase marks, or to situate the leading edge of the first phase mark in alignment with the graduation which governs the distribution of the data, or to admit via the input of the selector circuits 57 and 62 only transitions related to scanning the phase marks.

The interpolator circuit 59 interprets the detection times defined by the transitions issued by the circuits 57 and 62 according to a subdivision of the cycle of the clock 70 provided by a frequency multiplier circuit 66 connected to the latter. The time values assigned to these instants serve as numeric data for accessing an interpolation table which sets the timebase synchronization error, taking as a marker the coincidence of the center of the spot with the middle C of the second phase mark. This error is used by the timebase circuit for the resynchronizations carried out on each scanning of a set of phase marks. The synchronization error is taken on the transition selected by the circuit 62, for example. The timebase 71 is used to syncrhonize the feeding of the usable data into a buffer memory 65 which is controlled by a timing generator 69.

The data enters the buffer memory 65 after it is reshaped by the circuit 56. It is available at the output 72.

The timebase 71 also controls a sampling winddow generator 63 which selects together with a circuit 58 one or more samples of the signal indicating the read beam focusing error. This signal is provided by the photodetector means 55. The samples of the defocusing indication signal may be taken from an area of the information medium devoid of prewriting or from prewritten areas such as a centered area or two areas offcenter in different directions. The circuit 58 controls the motor 67 which focuses the optical beam.

In the foregoing description, there are described compact prewritten structures which use sinuous or staircase shaped patterns. However, providing that the dimensional characteristics of the prewriting can be strictly controlled, an even more compact arrangement may be considered.

It is shown in FIG. 2 that the transitions in the reshaped read signal are subject to shifts associated with spot following errors relative to the axis of the track. Comparing curves (d) and (e), it is seen that the distance separating the transitions in the same sense corresponding to the scanning of the leading edges of patterns 13 and 14 changes when the spot moves away from the axis of the track. On the other hand, considering a pair of transitions in opposite senses which correspond to the scanning of the leading edge of one of the patterns 13 and 14 and the scanning of a trailing edge of the other of these patterns, it is seen that the distance thus defined is invariant relative to the track following error. It is thus possible to further reduce the overall size of the prewritten structure.

In FIG. 11 line (a) shows a prewritten structure consisting of two offcenter patterns 73 and 74 the leading and trailing edges of which are paired in a special way so as to permit resynchronization of the timebase.

The leading edge of the pattern 73 begins at the graduation 2 and is paired with the trailing edge of the pattern 74 so as to define a half-integer distance B represented in line (c) in FIG. 11. The trailing edge of the pattern 73 is paired with the leading edge of the pattern 74 to determine another half-integer distance A.

As compared with the structure of FIG. 2, it is seen that the structure of FIG. 11 makes it possible to eliminate entirely the centered phase marks 11 and 12 and that it situates the marks 73 and 74 which serve to detect spot following errors relative to the axis of the track 75 in such a way as to make it possible to use the transitions of opposite sign that they produce to resynchronize the timebase. It will be noted that in FIGS. 4 through 9 it is the transitions of the same sign generated by the edges of centered patterns which define the distances A and B.

Lines (b), (c), (d) and (e) of FIG. 11 do not call for any special comment, the same references designating the same elements as in the preceding figures.

As previously explained, it is matter of determining the timebase synchronization error $\Delta c$ by estimating the time at which the centre C of the mark 74 and the center of the read spot are coincident.

To this end there are shown in line (f) in FIG. 11 pulses 76 and 77 which respectively correspond to the positive and negative transitions in the reshaped signal shown in line (c).

To sample the negative transition produced when the spot reaches the pattern 74, it is necessary to generate a sampling window exclusively centered on this transition, which appears at the distance A from the end of scanning the pattern 73.

By way of non-limiting example, the first transition selector circuit 57 (FIG. 10) comprises a counter incremented by pulses received from the frequency multiplier circuit 66.

This counter is reset to zero when the time elapsed is slightly greater than the duration which corresponds to the distance A.

The counter begins to count when it receives a pulse 76 and a logic circuit associated with the counter forms a sampling window between a value slightly less than the duration which corresponds to A and the resetting to zero. This is shown in line (g) in FIG. 11 in which the pulse 78 symbolizes the incrementing to $A-\epsilon$ and the pulse 79 the incrementing to $A+\epsilon$. The error $\epsilon$ is half the width of the sampling window and it is seen in line (g) that several windows $F_1$, $F_4$, $F_2$ are thus generated by the pulses 76. The window $F_4$ is that used to sample the negative pulse 80 as shown in line (h) in FIG. 11. This pulse is supplied to the interpolator circuit 59 which determines a value $H_4$ as shown in line (k) in FIG. 11.

Having first dated the pattern 74, it is also necessary to mark the end of the scanning of this pattern. This is achieved by the second selector circuit 62 which comprises a counter which reacts to the negative pulses 77 to define another sampling window. As seen in line (i) in FIG. 11, the pulses 81 and 82 represent $B-\epsilon$ and $B+\epsilon$ and line (j) shows the pulse 83 selected which determines at the interpolator circuit 59 a second value $H_B$ shown in line (k) in FIG. 11. By linear interpolation or using a table of values with two entries, the interpolator circuit 59 determines the value $H_C$ shown in line (k) in FIG. 11 and finally the timing error $\Delta c$ which is used to resynchronize the timebase.

In the foregoing description it is shown how it is possible to compensate for synchronization deficiencies due to the departure of the spot from the longitudinal axis of the track. It is a matter of combining the leading and trailing edges of two patterns so as to define two characteristic distances which are invariant relative to the offset of the spot. When the pairing is based on a first marking by the two leading edges and on a second marking by the two trailing edges, these edges must be centered and in this case the patterns are partially offcenter to provide for sensing the track following error. When the pairing is based on a marking by one leading edge and one trailing edge, these edges are offcenter in opposite senses so that sensing of the track following error and resynchronization of the timebase may be achieved using entirely offcenter patterns. The use of sinuous patterns offers the advantage of reducing the synchronization inaccuracy due to imperfections in prewriting the patterns. The use of exclusively offcenter patterns achieves greater compactness, but on the other hand requires greater precision in the control of the dimensions of the prewriting. In any event, the solutions described in the context of the present invention are clearly advantageous over those which required that the track following marks be preceded by one or more precursor patterns for directly controlling the sampling of these marks.

The invention is applicable to all recording layer systems. It should be noted that the prewriting may comprise in the areas reserved for transcribing usable data parts which cooperate in defining the phase marks and extensions of which form a reverse pattern, so to speak, in the sense that its trailing edge precedes its leading edge. The postwriting resulting from the transcription of the usable data may be such that it produces increased reflectivity on the information medium. The result of this is that the reshaped signal does not contain any transitions due to the usable data and that the data may be reshaped with a decision threshold having a value higher than that used to reshape the signal for reading the prewriting. This occurs in particular when the data sectors include a continuous prewritten groove and when the recordable layer is a layer of bubbles the detachment of which produces the increase in reflectivity.

It will be understood that various changes in the details, materials and arrangements of parts which have been herein described and illustrated in order to explain the nature of the invention may be made by those skilled in the art within the principle and scope of the invention as expressed in the appended claims.

For example, the invention encompasses other forms of sinuous or rectilinear prewritten patterns conjointly implementing the functions of sampled track following and timebase resynchronization.

I claim:

1. Optical recording medium comprising a track divided into sectors and having a longitudinal axis, areas on said track for writing data using a predetermined increment, prewritten marker areas on said track alternating with said data writing areas and each comprising at least two patterns having leading and trailing edges, and a part of at least one of said patterns which is offcenter relative to said axis and associated with at least one edge of a pair of leading and trailing edges combined with another pair of leading and trailing edges to define along said axis two predetermined distances each of which is between two consecutive multiples of said data writing increment, whereby said patterns are adapted to be scanned optically in succession by a read spot to sense any track following error by virtue of interaction of said read spot with at least said offcenter pattern part and with reference to a timebase synchronization signal resulting from interaction of said read spot with at least two leading edges and at least two trailing edges.

2. Recording medium according to claim 1, wherein one of said distances is the distance between consecutive leading edges, said leading and trailing edges being centered on said axis.

3. Recording medium according to claim 1, wherein one of said distances is the distance between a leading edge and a trailing edge, said patterns being totally offcenter relative to said axis in a symmetrical arrangement.

4. Recording medium according to claim 1, wherein each of said patterns has an offcenter part.

5. Recording medium according to claim 2, wherein one of said patterns is entirely centered relative to said axis.

6. Recording medium according to claim 5, wherein said entirely centered pattern is an extension of a pattern which forms part of sectors of said track on either side of the sector containing said prewritten area.

7. Recording medium according to claim 2, wherein two consecutive patterns have parts offcenter relative to said axis in symmetrical arrangement.

8. Recording medium according to claim 2, wherein the same pattern has two parts offcenter relative to said axis in a symmetrical arrangement.

9. Recording medium according to claim 8, comprising two patterns each of which has two parts offcenter relative to said axis in a symmetrical arrangement.

10. Recording medium according to claim 5, wherein said centered pattern is associated with two other patterns each having a centered edge and an offcenter part.

11. Recording medium according to claim 1, wherein at least one of said patterns has a sinuous shape.

12. Optical track following device for use with an optical recording medium comprising a track dividend into sectors and having a longitudinal axis, areas on said track for writing data using a predetermined increment, prewritten marker areas on said track alternating with said data writing areas and each comprising at least two patterns having leading and trailing edges, and a part of at least one of said patterns which is offcenter relative to said axis and associated with at least one edge of a pair of leading and trailing edges combined with another pair of leading and trailing edges to define along said axis two predetermined distances each of which is between two consecutive multiples of said data writing increment, whereby said patterns are adapted to be scanned optically in succession by a read spot to sense any track following error by virtue of interaction of said read spot with at leat said offcenter pattern part and with reference to a timebase synchronization signal resulting from interaction of said read spot with at least two leading edges and at least two trailing edges, said device comprising means for sensing pattern edges and offcenter parts of patterns and producing a read signal in which, after reshaping, transitions which are meaningful in relation to said predetermined distances are all in the same sense.

13. Optical track following device for use with an optical recording medium comprising a track divided into sectors and having a longitudinal axis, areas on said track for writing data using a predetermined increment, prewritten marker areas on said track alternating with said data writing areas and each comprising at least two patterns having leading and trailing edges, and a part of at least one of said patterns which is offcenter relative to said axis and associated with at least one edge of a pair of leading and trailing edges combined with another pair of leading and trailing edges to define along said axis two predetermined distances each of which is between two consecutive multiples of said data writing increment, whereby said patterns are adapted to be scanned optically in succession by a read spot to sense any track following error by virtue of interaction of said read spot with at least said offcenter pattern part and with reference to a timebase synchronization signal resulting from interaction of said read spot with at least two leading edges and at least two trailing edges, wherein one of said distances is the distance between a leading edge and a trailing edge, said patterns being totally offcenter relative to said axis in a symmetrical arrangement, said device comprising means for sensing pattern edges and offcenter parts of patterns and producing a read signal in which, after reshaping, transitions which are meaningful in relation to said predetermined distances are transitions of opposite sense.

14. Device according to claim 12, wherein said sensing means comprise counting means supplying a frame for transitions characterizing the edges of a pattern and interpolator means for marking coincidence of the center of said read spot with the center of a pattern.

15. Device according to claim 13, wherein said sensing means comprise counting means supplying a frame for transitions characterizing the edges of a pattern and interpolator means for marking coincidence of the center of said read spot with the center of a pattern.

* * * * *